United States Patent Office 3,759,740
Patented Sept. 18, 1973

3,759,740
PROCESS FOR BINDING PIGMENTS
TO GLASS FABRICS
James K. Campbell, Midland, Mich., assignor to Dow
Corning Corporation, Midland, Mich.
No Drawing. Original application Aug. 6, 1968, Ser. No. 750,472, now Patent No. 3,634,297. Divided and this application May 12, 1971, Ser. No. 143,687
Int. Cl. B32b 17/10, 27/12
U.S. Cl. 117—126 GS    2 Claims

ABSTRACT OF THE DISCLOSURE

A process is disclosed for binding pigments to glass fabric, said process comprising (A) applying to the glass fabric an aqueous emulsion of (1) a copolymer prepared by emulsion polymerization which consists essentially of (a) 50 to 90 mol percent $(CH_3)_2SiO$ units and (b) 10 to 50 mol percent of $RSiO_{3/2}$ units wherein R is an alkyl or alkenyl radical containing from 1 to 3 carbon atoms, a phenyl radical or a 3,3,3-trifluoropropyl radical, and (2) a water dispersible pigment, and (B) drying the glass fabric. Conventional silicone or organic post-finishes can be applied over the above compositions.

---

This application is a division of application Ser. No. 750,472 filed Aug. 6, 1968, now U.S. Pat. 3,634,297.

Past efforts to employ silicones as pigment binders on glass fabrics have generally been unsuccessful. Either the silicone has been ineffective as a pigment binder or, if effective, the silicone has resulted in a stiffening of the fabric which results in an undesirable hand giving the glass fabric poor flexural strength.

It is an object of this invention to provide a silicone pigment binder for glass fabrics which is equal to or superior to the currently available organic pigment binders. It is another object of this invention to provide a pigment binder for glass fabrics which will also impart to the glass fabric a soft hand. It is a further object of this invention to provide a pigment binder for glass fabric which gives improved flexural strengths and abrasion resistance to the fabric when compared with conventional organic pigment binders presently being employed. Other objects and advantages of this invention will be apparent from the following detailed description of the invention, the examples, and the claims.

This invention relates to an aqueous emulsion of a copolymer consisting essentially of (a) 50 to 90 mol percent of $(CH_3)_2SiO$ units and (b) 10 to 50 mol percent of $RSiO_{3/2}$ units, wherein R is selected from the group consisting of alkyl and alkenyl radicals containing from 1 to 3 carbon atoms, the 3,3,3-trifluoropropyl radical, and the phenyl radical, said copolymer having been prepared by emulsion polymerization.

This invention also relates to a process for binding a pigment to glass fabric which comprises (A) applying to the glass fabric an aqueous emulsion of a copolymer consisting essentially of (a) 50 to 90 mol percent of $(CH_3)_2SiO$ units and (b) 10 to 50 mol percent of $RSiO_{3/2}$ units, wherein R is selected from the group consisting of alkyl and alkenyl radicals containing from 1 to 3 carbon atoms, the 3,3,3-trifluoropropyl radical, and the phenyl radical, said copolymer having been prepared by emulsion polymerization, and (2) a water dispersible pigment, and (B) drying the glass fabric.

As can be seen from the above description of the invention, the essential component of the aqueous emulsion which functions as the pigment binder is a copolymer consisting essentially of 50 to 90 mol percent of dimethylsiloxane units and 10 to 50 mol percent of $RSiO_{3/2}$ units, wherein R is selected from the group consisting alkyl and alkenyl radicals containing from 1 to 3 carbon atoms, the 3,3,3-trifluoropropyl radical, and the phenyl radical. By way of specific example, the R radical can be a methyl, ethyl, propyl, isopropyl, vinyl, allyl, 3,3,3-trifluoropropyl or a phenyl radical. It is preferred at this time that R be a phenyl radical.

It will also be noted that it was indicated that the siloxane copolymer must be prepared by emulsion polymerization. The emulsion polymers can be prepared by the processes described in detail in U.S. Pats. 2,891,920 and 3,294,725, the disclosures of which are incorporated herein by reference. Broadly speaking, the emulsion polymerization process involves adding a mixture of either dimethyldimethoxysilane or dimethylcyclosiloxanes with $RSi(OCH_3)_3$ to an agitated surfactant-catalyst mixture whereby the copolymer is formed. Alternatively, the silanes and/or siloxanes can be added sequentially to the surfactant-catalyst mixture to obtain the copolymer. It has been found that in order to obtain the desired properties the ratio of the dimethylsiloxane units to the silsesquioxane units must be within the range specified above. It is preferable that the copolymer contain 75 to 85 mol percent of the dimethylsiloxane units and 15 to 25 mol percent of the silsesquioxane units. So far as is known at this time the optimum copolymer is composed of 80 percent dimethylsiloxane units and 20 mol percent phenylsilsesquioxane units. While the emulsions can be either anionic or cationic in nature, the latter is preferred at this time because it is more compatible with the overall system.

The amount of the silicone copolymer in the aqueous emulsion is not critical so far as is known at this time. The most significant factor in this respect is the stability of the emulsion itself and therefore, generally speaking, the silicone solids content in the emulsion generally should be less than 35 percent by weight.

The amount of silicone that is applied to the glass fabric will generally run within the range of 0.1 to 3.0 percent by weight of silicone solids based on the dry weight of the glass fabric being treated although more than 3 percent of the silicone can be applied to the glass fabric. Usually no significant advantages are obtained by applying more than 1 percent of the silicone to the glass fabric.

In accordance with the process of this invention, one first applies to the glass fabric an aqueous emulsion containing the silicone copolymer and a water dispersible pigment. After the emulsion of these two components is applied to the glass fabric, the fabric is dried.

The aqueous emulsion can be applied to the glass fabric by any of the usual treatment techniques such as spraying or brushing the emulsion onto the glass fabric, or by dipping the glass fabric into the emulsion. However, for best results it is believed that the emulsion should be padded onto the fabric using equipment that is readily available and in use in the industry and which fits well into the current production systems.

After the emulsion has been applied, the glass fabric can be either air-dried or dried by placing it in a circulating air oven at an elevated temperature for an appropriate period of time. Obviously, air drying in an oven for a short period of time is most desirable since it cuts down processing time.

After the fabric has been dried, a commercially available post-finish either of the silicone or organic type can be applied by repadding with an emulsion of the post-finish composition. A post-finish is not essential, however, in order to obtain the advantages of the instant invention.

It should be noted at this point that the particular pigment used to color the glass fabric is not critical so long as it is a water dispersible pigment. Numerous lists of suitable pigments are available in the literature and hence will not be repeated again here. The list of pigments found on pages 128–134 of Part D in Volume 43 of the 1967 Technical Manual of the American Association of Textile Chemists and Colorists (AATCC) is illustrative of such lists and incorporated herein by reference. No meaningful limits can be set with respect to the amount of pigment employed either in the emulsion nor to be deposited on the fabric since this is dependent solely on the wishes of the person dyeing the fabric and the shade of color they wish to obtain.

Now in order that those skilled in the art may better understand how the present invention can be practiced, the following examples are given by way of illustration and not by way of limitation.

In the examples, the fabric samples were 9" x 18" with the 9" length being in the warp direction. After treatment the fabric samples were cut into the necessary number and size specimens needed for the various test evaluations. For creased tensile strength evaluation, three specimens each 1¼" x 9". For wash durability and handle evaluations three specimens each 3" x 9" and for crocking resistance testing, one specimen 4" x 9". In all specimens the 9" length was in the warp direction. The specimens used for the creased tensile test were raveled from 1¼" to 1" strips removing the outer warp fibers until the strips measured exactly 1" in width, then folded end to end in the 9" direction and placed in a Carver laboratory press so that the fold was between the press plates to a distance of 1½ to 2". 3000 p.s.i. of pressure was applied to the fold for 15 seconds after which the specimens were removed and pulled on a Scott tester at a speed of 2" draw per minute until the specimen broke. The results are reported in the examples as pounds per square inch (p.s.i.).

Two of the specimens for wash durability were edged with an adhesive (Ubabond®) to prevent fraying during the wash cycles. These edged specimens were washed in a washing machine (Kenmore 600) using the low water level, a normal wash cycle which was approximately 12 minutes long, a hot water wash with 50 ml. of detergent (Tide), and a warm water rinse. Approximately two yards of 80 x 80 cotton print cloth was added as ballast during the washing cycle. At the end of one cycle (wash, rinse, spin) the specimens and ballast were removed and dried in an electric dryer (Kenmore) for 20 to 30 minutes on the wash-and-wear setting of the machine. After drying, one of the specimens and the ballast were returned to the washing machine for two more consecutive wash cycles. At the end of the two wash cycles, the remaining specimen was once more dried. The washed specimens were then compared to each other and rated on the International Geometric Scale as set forth in the AATCC Test Method 61–1962. In this test a rating of 5 indicates no change in color, with successively lower numerical ratings indicating successively more drastic changes in color due to washing.

Both the wet and dry crocking resistance evaluations were done according to the AATCC Standard Test Method 8–1961 and rated on the AATCC chart for measuring transference of color. The lower the numerical rating in the crocking resistance test, the more color that was transferred due to rubbing. 5 is the best rating given in this test method and 1 is the lowest.

The Flex Life is a test of abrasion resistance and was determined by continuously flexing the sample until failure. This test was conducted on a Stoll flex abrader. Three pounds tension was maintained during flexing on the ⅛" rod around which the fabric was wrapped.

Handle was evaluated by comparing the feel of the unwashed treated glass fabric specimens and rating them by a descriptive phrase.

EXAMPLE 1

A mixture of 1389.05 grams of distilled water, 14.15 grams of ammonium hydroxide and 43.8 grams of sodium tridecyl ether sulfate (Sipex EST–60) was heated to 60° C. and then a mixture of 480 grams of dimethyldimethoxysilane and 198 grams of phenyltrimethoxysilane was added thereto with agitation over a period of about 1½ hours. After the addition was complete, agitation was continued for an additional 30 minutes after which 708.5 grams of methanol and water were distilled off. The emulsion was then neutralized with dilute acetic acid to a pH of 7. The resulting product was an emulsion of a copolymer of 80 mol percent of $(CH_3)_2SiO$ units and 20 mol percent of $C_6H_5SiO_{3/2}$ units.

EXAMPLE 2

A mixture of 945.5 grams of distilled water, 22.5 grams of dodecylbenzenesulfonic acid (Biosoft S–100) and 291.1 grams of dimethylcyclosiloxanes was agitated for about 20 minutes and then homogenized at 4000 p.s.i. on a Manton Gaulin homogenizer. The homogenized mixture was then heated to 85° C., with agitation, and held at this temperature for 2 hours. Then 240.9 grams of phenyltrimethoxysilane was added over a period of 1 hour. Heating of the emulsion was continued at 85° C. for another hour after addition of the silane was complete, and then the emulsion was neutralized to a pH of 7 with a 20 percent solution of sodium hydroxide. The resulting emulsion contained a copolymer of 76 mol percent $(CH_3)_2SiO$ units and 24 mol percent $C_6H_5SiO_{3/2}$ units.

EXAMPLE 3

Beta glass fabric was treated by padding at 40 p.s.i. from an aqueous emulsion containing a water dispersible blue pigment (Aridye Padding Blue 2G) and a silicone copolymer composed of 76 mol perment dimethylsiloxane units and 24 mol percent phenylsilsesquioxane units prepared in the manner described in Example 2. The emulsion contained about 2.2 percent by weight of the silicone copolymer and 0.5 percent by weight of the pigment, these concentrations being such that at 40 p.s.i. padding pressure, there was an add on (based on the dry weight of the fabric) of about 0.15 percent of pigment and 0.67 percent of the silicone pigment binder. After padding, the fabric was dried in a circulating air oven at 350° F. (177° C.) for about 2 minutes. After this initial padding and drying operation, some of the fabric was given a post-finish either with a commercial organic or a commercial silicone finish. These post-finishes were also applied by padding at 40 p.s.i. from 2 percent aqueous emulsions of those finishes. Approximately 0.2 percent of the post-finish based on the dry weight of the fabric was deposited on the fabric. After the post-finish treatment, the fabrics were again oven dried at 350° F. for 1½ minutes. The resulting fabrics were then cut into the appropriate test specimens and evaluated by the tests described above. An untreated piece of glass fabric was included for purposes of comparison. The test results are set forth in the table below.

| Post finish | Wash durability | | Crocking resistance | | Flex life | Crease tensile (p.s.i.) |
|---|---|---|---|---|---|---|
| | 1 wash | 3 washes | Wet | Dry | | |
| Untreated glass | | | | | 14 | 13.3 |
| None | 4 | 3 | 3 | 2 | 130 | 13.7 |
| Organic a | 5 | 5 | 5 | 3 | 390 | 24.6 |
| Silicone b | 5 | 4 | 4 | 2 | 4,040 | 19.7 | a Quilon S a stearate-chrome complex.
b A methyl hydrogen organopolysiloxane emulsion.

EXAMPLE 4

Glass fabric was treated as in Example 3 using two different silicone copolymers. The first copolymer consisted of 80 mol percent dimethylsiloxane units and 20 mol percent phenylsilsesquioxane units and was the one prepared by Example 1 above. The second copolymer was prepared by the same procedure but consisted of 60 mol percent dimethylsiloxane units and 40 mol percent of the phenylsilsesquioxane units. The glass fabric in this example was post-finished with the same commercial organic finish employed in Example 3. Included here for comparison was glass fabric that was treated with a commercial polyethylacrylate emulsion pigment binder (Rhoplex E-32). The fabrics treated with the above materials were evaluated as before and the test results are set forth in the table below. The handle of the fabric treated with the silicone pigment binder was found to be soft and smooth whereas the fabric treated with the acrylic pigment binder was found to be dry and raspy.

| Pigment binder | Wash durability | | Crocking resistance | | Flex life | Crease tensile (p.s.i.) |
|---|---|---|---|---|---|---|
| | 1 wash | 3 washes | Wet | Dry | | |
| 80 mol percent $(CH_3)_2SiO$ 20 mol percent, $C_6H_5SiO_{3/2}$ | 5 | 5 | 4 | 2 | 507 | 21.5 |
| 60 mol percent $(CH_3)_2SiO$ 40 mol percent, $C_6H_5SiO_{3/2}$ | 5 | 3 | 4 | 3 | 224 | 8.8 |
| Rhoplex E-32[a] | 5 | 4 | 3 | 3 | 132 | 5.1 |

[a] A polyethylacrylate emulsion.

EXAMPLE 5

In this example, glass fabric was treated with a silicone pigment binder as in Example 3. However, in this example, three different copolymers were employed all of which were prepared from dimethylcyclosiloxanes according to the procedure described in Example 2 above. The copolymer composed of 76 mol percent dimethylsiloxane units and 24 mol percent of phenylsilsesquioxane units is the copolymer specifically prepared in that example. All of these specimens of glass fabric were post-finished with the commercial organic finish of Example 3. These test specimens were evaluated as before and the results are set forth in the table below.

| Pigment binder | Wash durability | | Crocking resistance | | Flex life | Crease tensile (p.s.i.) |
|---|---|---|---|---|---|---|
| | 1 wash | 3 washes | Wet | Dry | | |
| 80 mol percent $(CH_3)_2SiO$ 20 mol percent, $CH_3SiO_{3/2}$ | 5 | 4 | 4 | 1 | 166 | 33.7 |
| 50 mol percent $(CH_3)_2SiO$ 50 mol percent, $CH_3SiO_{3/2}$ | 4 | 3 | 3 | 1 | 190 | 33.7 |
| 76 mol percent $(CH_3)_2SiO$ 24 mol percent, $C_6H_5SiO_{3/2}$ | 5 | 5 | 4 | 2 | 194 | 34.9 |

EXAMPLE 6

Glass fabric was treated as in Example 3 using two different silicone copolymer pigment binders, and in the case of pigment binder A, a water dispersible green pigment (Padding Green G) was used. Pigment binder A consisted of 80 mol percent dimethylsiloxane units and 20 mol percent phenylsilsesquioxane units. Pigment binder B consisted of 80 mol percent dimethylsiloxane units and 20 mol percent methylsilsesquioxane units. The glass fabric in this example was post-finished with 1.5 percent (based on the weight of the dry fabric) of a silicone copolymer composed of dimethylsiloxane units and (methyl)beta-amino-ethyl-gamma-aminopropylsiloxane units. The fabrics so treated were evaluated as before and the test results are set forth in the table below.

| Pigment binder | Wash durability | | Crocking resistance | | Flex life | Crease tensile (p.s.i.) |
|---|---|---|---|---|---|---|
| | 1 wash | 3 washes | Wet | Dry | | |
| A | 5 | 4 | 5 | 2 | 538 | 26.5 |
| B | 4 | 3 | 5 | 2 | 166 | 33.7 |

EXAMPLE 7

When the copolymers set forth below, containing the indicated mol percents of the various units, are substituted for the silicone pigment binders of the previous examples, essentially identical results are obtained.

(A)

| | Percent |
|---|---|
| $(CH_3)_2SiO$ | 90 |
| $C_6H_5SiO_{3/2}$ | 10 |

(B)

| | |
|---|---|
| $(CH_3)_2SiO$ | 80 |
| $C_2H_5SiO_{3/2}$ | 20 |

(C)

| | |
|---|---|
| $(CH_3)_2SiO$ | 80 |
| $CH_3SiO_{3/2}$ | 15 |
| $C_3H_7SiO_{3/2}$ | 5 |

(D)

| | |
|---|---|
| $(CH_3)_2SiO$ | 85 |
| $CH_2=CHSiO_{3/2}$ | 15 |

(E)

| | |
|---|---|
| $(CH_3)_2SiO$ | 65 |
| $C_6H_5SiO_{3/2}$ | 35 |

(F)

| | |
|---|---|
| $(CH_3)_2SiO$ | 80 |
| $CH_3SiO_{3/2}$ | 10 |
| $CF_3CH_2CH_2SiO_{3/2}$ | 10 |

That which is claimed is:

1. A process for binding a pigment to a glass fabric which comprises
   (A) applying to the glass fabric an aqueous emulsion of
      (1) a copolymer consisting essentially of (a) 75 to 85 mol percent of $(CH_3)_2SiO$ units and (b) 15 to 25 mol percent of $C_6H_5SiO_{3/2}$ units, said copolymer having been prepared by emulsion polymerization, and
      (2) a water dispersible pigment, and
   (B) drying the glass fabric.
2. The process as defined in claim 1 wherein (a) is 80 mol percent, and (b) is 20 mol percent.

References Cited
UNITED STATES PATENTS

| 2,891,920 | 6/1959 | Hyde et al. | 117—161 Z A |
| 3,494,788 | 2/1970 | Bey | 117—161 Z A |
| 2,778,746 | 1/1957 | Steinman et al. | 117—126 G S |

WILLIAM D. MARTIN, Primary Examiner

W. H. SCHMIDT, Assistant Examiner

U.S. Cl. X.R.

117—161 ZA